Patented Nov. 1, 1938

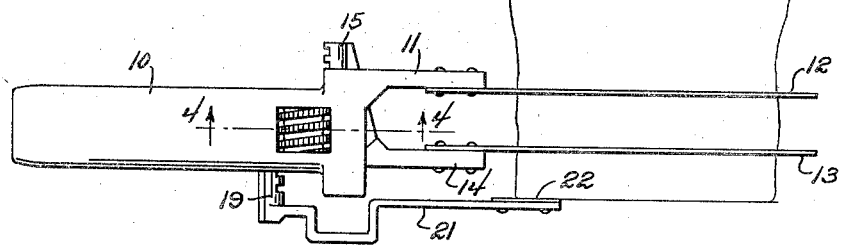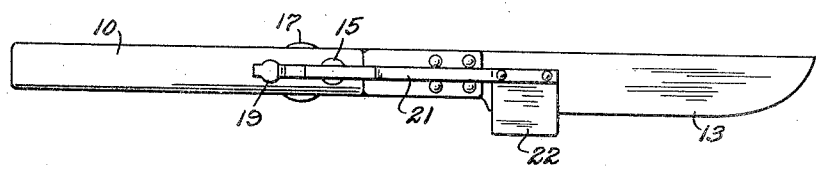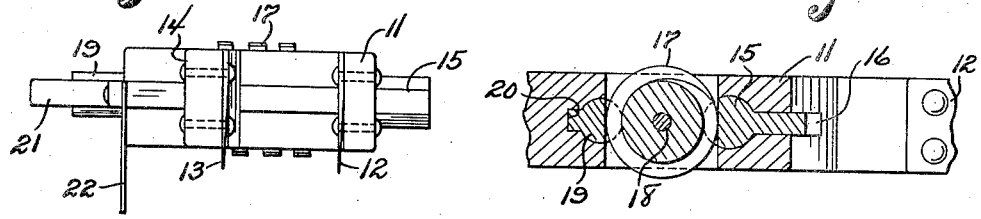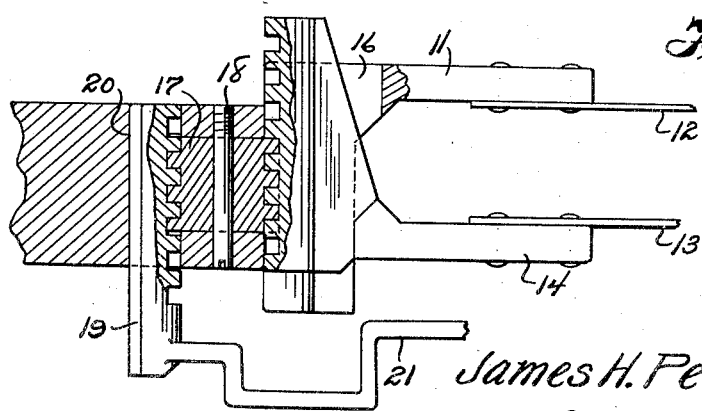

2,134,839

UNITED STATES PATENT OFFICE 2,134,839

ADJUSTABLE KNIFE

James H. Perkins, Winchester, Ky.

Application January 5, 1937, Serial No. 119,162

1 Claim. (Cl. 30—304)

The invention relates to an adjustable knife and more especially to a double bladed adjustable knife.

The primary object of the invention is the provision of a knife of this character, wherein the two blades are susceptible of adjustment with relation to each other so as to enable the knife to cut slices of uniform thickness or such knife may be used for cutting ingredients for salads, vegetables, soup, potatoes, onions, apples and mincing of ingredients at the option of the user of such knife.

Another object of the invention is the provision of a knife of this character, wherein the several blades thereof can be adjusted with respect to each other for thin or thick slicing or cutting action of the knife and supplementing these blades is a gage which is also adjustable with respect to the blades of the said knife.

A further object of the invention is the provision of a knife of this character, which is simple in construction, reliable and effective in operation, conveniently adjusted, strong, durable, easily handled, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a top plan view of a knife constructed in accordance with the invention shown in position for slicing a loaf of bread.

Figure 2 is a side elevation thereof.

Figure 3 is an end elevation.

Figure 4 is an enlarged sectional view taken on the line 4—4 of Figure 1 looking in the direction of the arrows.

Figure 5 is an enlarged fragmentary horizontal sectional view taken longitudinally of the knife.

Similar reference characters indicate corresponding parts throughout the several views in the drawing.

Referring to the drawing in detail, the knife comprises a stock 10 forming a straight handle having at one end a laterally offset stationary ear 11 to which is riveted or otherwise fixed a knife blade 12. Next to the blade 12 is a second knife blade 13 riveted or otherwise fixed to an ear 14 integral with and at one end of a laterally disposed toothed rack 15 which is slidably fitted in a guide way 16 provided in the handle 10 next to the ear 11 and crosswise of said handle.

Within a suitable cavity in the handle 10 and communicating with the way 16 is an externally knurled worm screw adjusting wheel 17 engaging the rack 15 and being journaled upon an axle spindle 18 fitted within said handle.

The wheel 17 also meshes with a toothed rack 19 slidable in a guide way 20 crosswise of the handle and on the opposite side of said wheel 17 with respect to the guide way 16. This rack 19 is formed with an arm 21 having at its outer end a gage plate or head 22 disposed parallel to the blade 13 next thereto.

The wheel 17 has its outer periphery exposed through opposite sides of the handle 10 so that it can be manually turned with the fingers of an operator or user of the knife and on manipulation of the wheel 17 the blades 12 and 13 can be adjusted with respect to each other and simultaneously an adjustment of the gage including the arm 21 and the head 22 may be had.

The setting of the gage and the knife blade 13 relative to the blade 12 permits uniformity in the slicing of the material by the knife blades. One position of the wheel 17 serves to space the blades 12, 13 and gage 22 equally relative to each other while other positions of the wheel 17 serve to space the gage and blade 13 relative to the blade 12 in a manner to permit thick and thin slices of the material to be cut simultaneously.

By the use of the two blades 12 and 13 two slices of material can be effected under one stroke for operation of the knife, the slicing being effected with dispatch and enabling uniformity in the size of the slices as may be cut.

What is claimed is:

A knife of the kind described comprising a pair of spaced parallel blades, carriers for the blades interfitted with each other, one of said carriers formed with a rack, a finger wheel mounted within the other carrier and threadedly engaging said rack for effecting adjustment of the blades with relation to each other, and a gage having a rack coacting with said wheel and adjustable thereby.

JAMES H. PERKINS.